United States Patent
Wilwerding

[15] 3,706,911
[45] Dec. 19, 1972

[54] CORRECT EXPOSURE ANNUNCIATOR CIRCUIT

[72] Inventor: Dennis J. Wilwerding, Littleton, Colo.

[73] Assignee: Honeywell Inc., Minneapolis, Minn.

[22] Filed: Jan. 28, 1971

[21] Appl. No.: 110,700

[52] U.S. Cl............315/158, 307/252 A, 307/252 J, 307/311, 315/151, 315/241 P
[51] Int. Cl...............................................H05b 41/36
[58] Field of Search..............307/252 A, 252 J, 311; 315/149, 156, 159, 150, 151, 241 P

[56] References Cited

UNITED STATES PATENTS

| | | | |
|---|---|---|---|
| 3,601,652 | 8/1971 | Burnett | 315/156 |
| 3,541,387 | 11/1970 | Ackermann | 315/159 |
| 3,524,986 | 8/1970 | Harnden | 315/156 |
| 3,210,556 | 10/1965 | Billings | 307/252 J |
| 3,440,488 | 4/1969 | Skiruin | 315/149 |

*Primary Examiner*—John Zazworsky
*Attorney*—Arthur H. Swanson and Lockwood D. Burton

[57] ABSTRACT

A switching means connects a light annunciator with a voltage source. The annunciator indicates that a scene has been sufficiently illuminated to properly expose a light sensitive film of an associated camera. The switching means is responsive to the operation of a light quenching means of a computer-flash system for providing an effective contact closure thereby energizing the annunicator. The switching means is then responsive to a manual switch opening or a subsequent operation of a light flashing means of the computer-flash system, for opening the switching means and de-energizing the annunciator.

23 Claims, 3 Drawing Figures

INVENTOR.
DENNIS J. WILWERDING
BY
Lockwood D. Burton
ATTORNEY.

3,706,911

CORRECT EXPOSURE ANNUNCIATOR CIRCUIT

The present invention relates generally to computer-flash systems, and more particularly to a correct exposure annunicator circuit for use with computer-flash systems.

Computer-flash systems have been provided wherein a light producing means is actuated to illuminate a scene to be photographed. A light sensing means detects the scene illumination and actuates a light quenching means when sufficient light has been produced to properly expose a light sensitive film of an associated camera means. Heretofore, meters have been provided whereby a photographer reads a value of the existing light level from a meter and then takes the picture if the existing light level, as read, is sufficient. A change in the light level which occurs after the light meter has been read, but before the picture was taken, may result in an improperly exposed picture. The photographer, however, will not be aware of the film being improperly exposed until a later time when the film is developed. In many cases, the scene being photographed is an impromptu scene which cannot be created at a later time. When light conditions are less than ideal, and supplemental light producing devices are required, the problem becomes more pronounced since light meters are of no help. Therefore, there has existed a need for a means of indicating to a photographer, immediately after taking a picture, that a scene being photographed has been sufficiently illuminated to properly expose a light sensitive film of a camera. In some computer-flash photographic systems, the light quenching means is a gas discharge tube during the operation of which an incidental light is emitted. That incidental light is normally confined to the immediate area of the quench tube. Some prior art devices have used that incidental light as an indication to a photographer that there has been sufficient light provided for proper exposure of a film, to a scene being photographed. Since the duration of the incidental light emitted by the light quenching tube is very brief, that momentary indication is very likely to occur and not be noticed by the photographer.

It is therefore an object of the present invention to provide an improved illumination sufficiency indicator.

It is another object of the present invention to provide an annunicator circuit for indicating that a scene being photographed has been sufficiently illuminated to properly expose a light sensitive film of an associated camera means.

It is a further object of the present invention to provide an annunciator circuit for providing a lasting indication that correct exposure has been attained.

It is a still further object of the present invention to provide an annunciator circuit wherein a correct exposure indication may be selectively terminated by a photographer.

It is yet another object of the present invention to provide a correct exposure indicator which is automatically terminated when a subsequent photographic cycle is initiated.

In accordance with these and other objects, there has been provided, in accordance with the present invention, a light emitting indicator, or correct exposure annunciator, connected to a voltage source by a switching means. The switching means is responsive to the operation of a quench circuit of a computer-flash system for providing an effective contact closure whereby the annunciator is energized. The switching means is then responsive to either a subsequent operation of a light producing means of the computer-flash system, or a selectively operable reset switch, for effectively opening the effective contact closure, whereby the annunciator is de-energized and made ready for the next operation.

A better understanding of the present invention may be had from the following detailed description when read in connection with the accompanying drawings, wherein.

Figure 1:
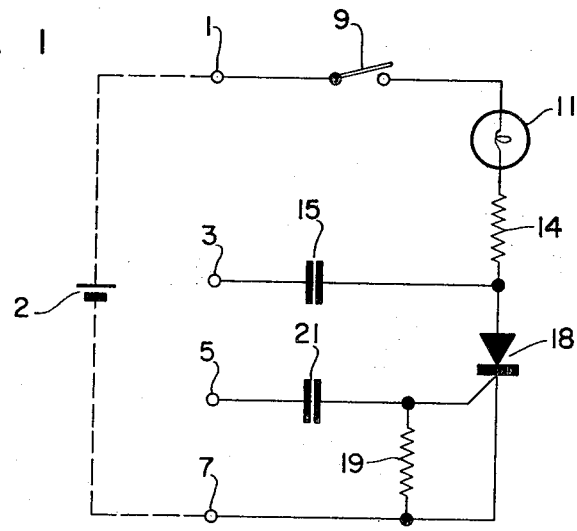
FIG. 1 is a schematic diagram illustrating one embodiment of the present invention.

Referring in detail to FIG. 1, there are shown four input terminals 1, 3, 5 and 7. A battery 2 is shown in phantom connecting the terminals 1 and 7. A series circuit comprising a manual switch 9, a light indicator or annunciator 11, a resistor 14, and a capacitor 15 connect the terminal 1 with the terminal 3. The junction between the resistor 14 and the capacitor 15 is connected to the anode of a silicon controlled rectifier (SCR) 18. A resistor 19 connects the gate and cathode terminals of the SCR 18. A capacitor 21 connects the gate terminal of the SCR 18 with the input terminal 5. The cathode terminal of the SCR 18 is connected to the input terminal 7.

In computer-flash photographic systems, a first control signal is generated which effects the operation of light producing means. Subsequently, a second control signal is generated which is indicative of the operation of a light quenching means operative to effectively terminate the light given off by the light producing means. The generation of the second control signal is initiated by a light sensing means when sufficient light has been produced by the light producing means to sufficiently illuminate a scene being photographed to properly expose a light sensitive film in a camera. Therefore, the generation of the second control signal is a positive indication that a scene being photographed has been sufficiently illuminated to properly expose the film in a camera. For example, in U.S. Pat. No. 3,519,879 to Francis T. Ogawa, which is assigned to the Assignee of the present invention and included herein by references the light producing means is a flash tube 4 in FIG. 1 of the Ogawa patent; the first control signal is a sudden voltage decrease appearing at the point 13 therein when the switch 12 is actuated. The light quenching means shown by Ogawa as the quench tube 37 and the second control signal as sudden voltage change appearing at the point 25 when his light activated silicon controlled rectifier 17 becomes conductive. For the sake of convenience, FIG. 1 of the above referenced Ogawa patent has been partially reproduced and shown as FIG. 3 herein. In the operation of the present invention, the terminals 1 and 7 are connected across a voltage source or battery 2 shown in phantom. The terminal 3 is connected to a point in a photographic flash control circuit at which appears the first control signal, such as point 13 in FIG. 3. The input terminal 5 of FIG. 1 is connected to a point at which appears the second control signal, such as point 25 in FIG. 3. The switch 9 of FIG. 1 is closed when a photographer is ready to take a picture. The SCR 18 will then be nonconductive or open. Since the SCR 18 is open, the light indicator or annunciator 11 will be off. A first control signal indicative of the operation of a light producing means will appear at the input terminal 3 followed by the appearance of a second control signal at the input terminal 5, indicative of the operation of a light quenching means which effectively terminates the light given off by the light producing means. The second control signal appears in the form of a ringing signal, in the present example, appearing at the terminal 5. That ringing signal is coupled through the capacitor 21 to the gate terminal of the SCR 18. The positive going portion of the ringing second control signal renders the SCR 18 conductive. With the SCR 18 conductive, a circuit including the light indicator 11 is established between the terminals 1 and 7 across which the voltage source 2 is connected. Therefore, when the light indicator goes on, it signifies the correct exposure has been obtained, since the light quenching operation has been initiated. The correct exposure indicator or annunciator 11 will remain on until it has either been recognized by the photographer and the switch 9 is opened, or another picture taking cycle is begun as indicated by the appearance of a first control signal at the input terminal 3. That signal which is a momentary negative going pulse in the present example, will be coupled through the capacitor 15 to the anode of the SCR 18 thereby rendering the SCR 18 nonconductive and opening the light indicator circuit. It is understood that the switch 9 may be omitted from the circuit shown in FIG. 1, with the result that the correct exposure indicator would be turned off only by a subsequent first control signal indicative of a subsequent operation of the light producing means. Alternatively the input terminal 3 and the capacitor 15 may be omitted, and the correct exposure indicator or annunciator 11, once turned on by the appearance of a second control signal indicative of the operation of a light quenching means, will be turned off, solely by the opening of the switch 9 by the photographer.

Figure 2:
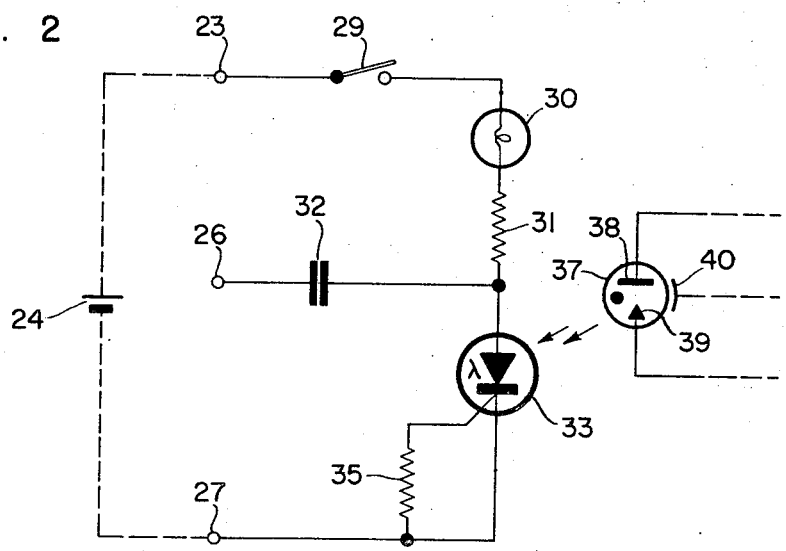
FIG. 2 is a schematic diagram illustrating a second embodiment of the present invention.
Figure 3:
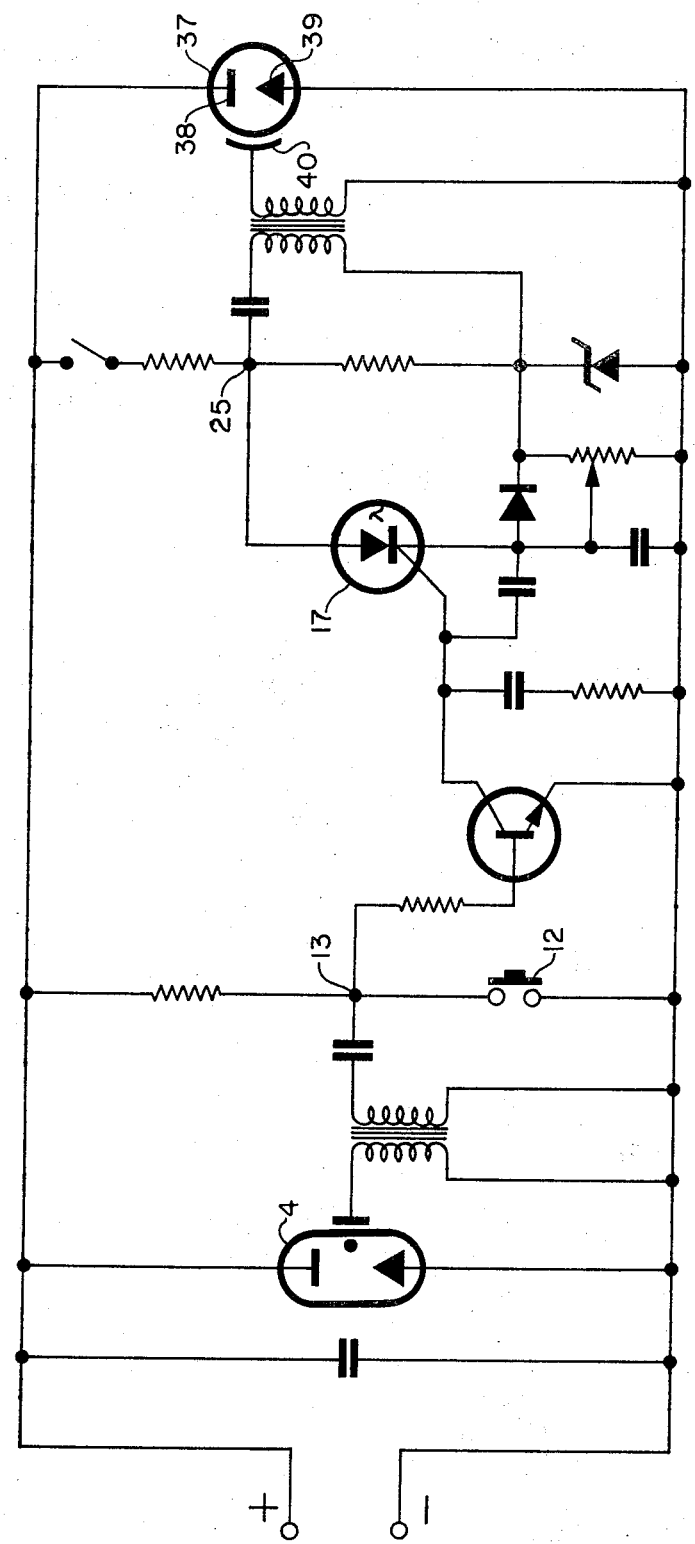
FIG. 3 is a schematic diagram of a computer-flash circuit.

In FIG. 2 there are shown three input terminals, 23, 26 and 27. A battery 24 is shown in phantom connecting the terminals 23 and 27. A series circuit comprising a switch 29, a light indicator 30, a resistor 31, and a capacitor 32 connects the input terminal 23 with the terminal 26. The junction between the resistor 31 and the capacitor 32 is connected to the anode terminal of a light activated silicon controlled rectifier (LASCR) 33. A resistor 35 connects the input terminal 27 to the gate terminal of the LASCR 33. The cathode terminal of the LASCR 33 is connected directly to the input terminal 27. A light quenching tube 37 is also shown with three electrodes 38, 39 and 40. The electrodes of the quench tube 37 are numbered and connected in the computer-flash circuit as shown in the above referenced patent of Francis T. Ogawa and FIG. 3 herein. The LASCR 33 arranged to be relatively close proximity to the quench tube 37. Since the quench tube 37 is a gas discharge tube, an incidental light is emitted therefrom during the conduction thereof. That incidental light represents the second control signal in the examplary embodiment shown in FIG. 2. LASCR 33 is arranged to detect and respond to that incidental light as an indication that the quench tube 37 has, indeed, fired and the light terminating operation of a computer-flash system has been effected. As hereinbefore mentioned, the operation of the quench tube 37 is also indicative of the fact that a scene being photographed has been sufficiently illuminated to properly expose a film in an associated camera. When a photographer is ready to take a picture, the switch 29 is closed. A first control signal is subsequently generated when the light producing operation has begun. After sufficient illumination has been received by a sensing means, as more fully explained in the referenced patent, the second control signal is generated which triggers the operation of the quench tube 37. The quench tube 37 will then emit an incidental light or second control signal when it becomes conductive. That incidental light is detected by the LASCR 33 and a current will be initiated from the gate terminal of the LASCR 33 through the resistor 35. That current will forward bias the gate-cathode junction of the LASCR 33, turning on the LASCR. A voltage source or battery 24, is normally connected between the input terminals 23 and 27; the input terminal 26 is connected to a point in a computer flash circuit at which appears a first control signal representing the operation of a light producing means such as point 25 of the referenced Ogawa patent as shown in FIG. 3 herein. When the LASCR 33 becomes conductive, a circuit is established including the voltage source appearing across the terminals 23 and 27 and the correct exposure indicator 30. The correct exposure indicator or annunciator 30 will then be turned on and will remain on until the photographer has recognized the indication and opened the switch 29 or the appearance of a subsequent first control signal at the terminal 26. As hereinbefore explained, the first control signal is in the form of a sudden decrease in voltage in the present example. When that sudden decrease in voltage appears at the terminal 26, it is coupled through the capacitor 32 to the anode terminal of the LASCR 33. The LASCR anode terminal voltage thereupon drops below its threshold voltage and the LASCR 33 will become nonconductive. It will understood that either the switch 29 or the capacitor 32 may be omitted from the circuit which would give similar results as the omission of the switch 9 or the capacitor 15 of FIG. 1.

Thus there has been provided in accordance with the present invention, a correct exposure annunciator circuit for use in combination with a computer flash system which provides a selectively terminable or automatically terminable indication to a photographer that a light sensitive film of a camera has been sufficiently exposed to a scene being photographed.

The embodiments of the invention in which an exclusive property or privilege is claimed are defined as follows:

1. An annunciator circuit for use with a photographic circuit, said photographic circuit including a first signal generating means for generating a first control signal, a second signal generating means for generating a second control signal, a light producing means responsive to said first control signal for initiating the operation of said light producing means whereby light is emitted therefrom, and a light quenching means responsive to said second control signal for initiating the operation of said light quenching means whereby said emitted light is effectively terminated, said annunciator circuit comprising:
a signal responsive annunciator indicator,
a control member serially connected in an energization circuit with said annunciator indicator,
said control member being responsive to said second control signal to effect a closure of said energization circuit, thereby activating said annunciator indicator, and
selectively operable means for subsequently interrupting said energization circuit.

2. The invention as set forth in claim 1 wherein said control member is a light activated silicon controlled rectifier (LASCR), having its anode-cathode path serially connected in said annunciator circuit, said LASCR being arranged in proximity ti said light quenching means whereby to render said LASCR conductive in response to light given off during an operation of said light quenching means.

3. The invention as set forth in claim 1 wherein said control member comprises a silicon controlled rectifier (SCR) having its anode-cathode path serially connected in said annunciator circuit and means for connecting the gate electrode thereof to said second signal generating means whereby to render said SCR conductive in response to said second control signal.

4. The invention as set forth in claim 3 wherein said annunciator indicator is a lamp member.

5. The invention as set forth in claim 3 wherein said selectively operable means is a manually operated switch means serially connected in said energization circuit, a momentary selective operation of which interrupts said energization circuit, rendering said SCR nonconductive.

6. The invention as set forth in claim 3 wherein said selectively operable means comprises means for connecting said first signal generating means to the anode of said SCR whereby to render said SCR nonconductive in response to said first control signal.

7. The invention as set forth in claim 2 wherein said annunciator indicator is a lamp member.

8. The invention as set forth in claim 2 wherein said selectively operable means is a manually operated switch means serially connected in said energization circuit, a momentary selective operation of which interrupts said energization circuit, rendering said SCR nonconductive.

9. The invention as set forth in claim 2 wherein said selectively operable means comprises means for connecting said first signal generating means to the anode of said LASCR whereby to render said LASCR nonconductive in response to said first control signal.

10. An annunciator circuit for use with a photographic circuit, said photographic circuit including a first signal generating means for generating a first control signal, a second signal generating means for generating a second control signal, a light producing means responsive to said first control signal for initiating the operation of said light producing means whereby light is emitted therefrom, and a light quenching means responsive to said second control signal for initiating the operation of said light quenching means whereby said emitted light is effectively terminated, said annunciator circuit comprising:

an annunciator indicator selectively operable between a first and a second condition;
a control member serially connected in an energization circuit with said annunciator indicator, said control member being responsive to said second control signal to effect a closure of said energization circuit thereby activating said annunciator indicator from said first condition to said second condition; and
means associated with said energization circuit for resetting said annunciator indicator to said first condition.

11. The annunciator circuit as set forth in claim 10 wherein said means associated with said energization circuit is responsive to said first control signal for resetting said annunciator indicator to said first condition.

12. The annunciator circuit as set forth in claim 11 wherein said control member comprises a silicon controlled rectifier (SCR) having its anode-cathode path serially connected in said energization circuit, and means for connecting the gate electrode thereof to said second signal generating means whereby to render said SCR conductive in response to said second control signal.

13. The annunciator circuit as set forth in claim 12 wherein said means associated with said energization circuit comprises a capacitor connecting said anode of said SCR with said first signal generating means.

14. The annunciator circuit as set forth in claim 10 wherein said means associated with said energization circuit comprises a selectively operable switching means.

15. A photographic apparatus comprising:
a first control signal generating means selectively operable for generating a first control signal:
a light producing means operative in response to said first control signal for providing light to illuminate a scene;
a second control signal generating means arranged to receive light from said scene, said second control signal generating means being operative to generate a second control signal upon receipt thereby of a predetermined amount of light from said scene;
light quenching means operative in response to said second control signal for effectively terminating said light provided by said light producing means;
an annunciator indicator selectively operable between a first and a second condition;
a control member serially connected in an energization circuit with said annunciator indicator, said control member being responsive to a signal indicative of a generation of said second control signal to effect a closure of said energization circuit thereby activating said annunciator indicator from said first condition to said second condition; and
means associated with said energization circuit for resetting said annunciator indicator to said first condition.

16. The photographic apparatus as set forth in claim 15 wherein said signal indicative of a generation of said second control signal is said second control signal, said control member comprising a silicon controlled rectifier (SCR) having its anode-cathode path serially connected in said energization circuit with said annunciator indicator, and means for applying said second control signal to the gate terminal of said SCR.

17. The photographic apparatus as set forth in claim 16 wherein said means associated with said energization circuit comprising a selectively operable switching means.

18. The photographic apparatus as set forth in claim 16 wherein said means associated with said energization circuit is responsive to said first control signal for resetting said annunciator indicator to said first condition.

19. The photographic apparatus as set forth in claim 18 wherein said means associated with said energization circuit comprises a capacitor connecting said anode of said SCR with said first signal generating means.

20. The photographic apparatus as set forth in claim 15 wherein said quenching means generates an incidental light during an operation thereof and said signal indicative of a generation of said second control signal is said incidental light, said control member comprising a light activated silicon controlled rectifier (LASCR) having its anode-cathode path serially connected in said energization circuit with said annunciator indicator, said LASCR being arranged in proximity to said light quenching means, said LASCR being rendered conductive, in response to said incidental light.

21. The photographic apparatus set forth in claim 20 wherein said means associated with said energization circuit comprises a selectively operable switching means.

22. The photographic apparatus as set forth in claim 20 wherein said means associated with said energization circuit is responsive to said first control signal for resetting said annunciator indicator to said first condition.

23. The photographic apparatus as set forth in claim 22 wherein said means associated with said energization circuit comprises a capacitor connecting said anode of said LASCR with said first signal generating means.

* * * * *